(12) United States Patent
Lariccia

(10) Patent No.: US 11,085,331 B2
(45) Date of Patent: Aug. 10, 2021

(54) FORCED AIR CONVECTION APPARATUS AND METHOD FOR COOLING A TURBOMACHINE

(71) Applicant: ROLLS-ROYCE plc, London (GB)

(72) Inventor: Michael Lariccia, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/893,962

(22) Filed: Jun. 5, 2020

(65) Prior Publication Data
US 2020/0392869 A1 Dec. 17, 2020

(30) Foreign Application Priority Data

Jun. 13, 2019 (GB) .................................... 1908477

(51) Int. Cl.
*F01D 25/24* (2006.01)
*F02K 3/06* (2006.01)

(52) U.S. Cl.
CPC ................ *F01D 25/24* (2013.01); *F02K 3/06* (2013.01); *F05B 2230/60* (2013.01); *F05B 2240/14* (2013.01); *F05D 2230/60* (2013.01); *F05D 2240/14* (2013.01)

(58) Field of Classification Search
CPC ........ F25D 17/06; F25D 15/00; F25B 25/005; F02K 3/06; F02C 7/12; F02C 7/143; F01D 25/24; F01D 25/285; F05D 2230/60; F05D 2240/14; F05D 2260/12; F05D 2260/213; F05D 2260/608; F05D 2260/83; F05B 2230/60; F05B 2240/14; Y02T 50/60
See application file for complete search history.

(56) References Cited

U.S. PATENT DOCUMENTS

| | | | | |
|---|---|---|---|---|
| 9,151,182 B2* | 10/2015 | Miller | ..................... | F01D 25/08 |
| 9,719,372 B2* | 8/2017 | Ballard, Jr. | ............. | F01D 25/14 |
| 2001/0022933 A1 | 9/2001 | Bangert et al. | | |

(Continued)

FOREIGN PATENT DOCUMENTS

| | | |
|---|---|---|
| CN | 207894613 U | 9/2018 |
| RU | 2344401 C1 | 1/2009 |

OTHER PUBLICATIONS

Nov. 25, 2020 Search Report issued in European Patent Application No. 20176706.8.

(Continued)

*Primary Examiner* — Igor Kershteyn
(74) *Attorney, Agent, or Firm* — Oliff PLC

(57) ABSTRACT

A forced air convection apparatus and method for cooling turbomachines is provided. The forced air convection apparatus for cooling a turbomachine, the apparatus comprising: a duct assembly having one or more outlets which are removably joinable to one or more corresponding air intakes of the turbomachine, and further having one or more inlets which are removably joinable to one or more corresponding exhausts of the turbomachine to enable closed loop recirculatory airflow through the turbomachine and the duct assembly and back to the turbomachine; and an air handling system having a blower arranged to blow air from the one or more inlets of the duct assembly to the one or more outlets of the duct assembly, and further having a heat exchanger configured to cool the air flowing through the duct assembly.

13 Claims, 3 Drawing Sheets

(56) References Cited

U.S. PATENT DOCUMENTS

| | | | |
|---|---|---|---|
| 2011/0048847 A1* | 3/2011 | Helgeson | F01N 1/084 |
| | | | 181/220 |
| 2011/0138772 A1* | 6/2011 | Zitouni | F01D 25/30 |
| | | | 60/226.1 |
| 2016/0290155 A1* | 10/2016 | Taccogna | A62C 2/10 |
| 2017/0216637 A1 | 8/2017 | Raimarckers et al. | |

OTHER PUBLICATIONS

Combined Search and Examination Report of the Intellectual Property Office of the United Kingdom for GB1908477.1 with report date of Nov. 28, 2019 and search date of Nov. 27, 2019.

\* cited by examiner

FORCED AIR CONVECTION APPARATUS AND METHOD FOR COOLING A TURBOMACHINE

CROSS-REFERENCE TO RELATED APPLICATIONS

This disclosure claims the benefit of UK Patent Application No. GB 1908477.1, filed on 13 Jun. 2019, which is hereby incorporated herein in its entirety.

TECHNICAL FIELD

The present disclosure relates to the field of turbomachines. In particular, the present disclosure relates to a forced air convection apparatus for cooling a turbomachine, e.g. for cold start testing of a turbomachine.

BACKGROUND

To certify new aircraft gas turbine engine designs, the engines must pass cold start tests wherein the ability to start engines at a temperature of −40° C. must be demonstrated. Conventional cold start tests require a gas turbine engine to be cooled using a method known as "soaking". Soaking involves placing a gas turbine engine within a very large cooling chamber which is hermetically sealed. Then the interior of the cooling chamber is cooled with the use of nitrogen down to a temperature of around −100° C. The entire cooling process requires between 18 and 24 hours to achieve the required temperature of −40° C. The cooling chamber must then be removed from the test facility within about 10 minutes in order to maintain the required temperature of the gas turbine engine. Once the cool chamber is removed, the cold start test is performed.

A number of drawbacks to the conventional method of cold start tests gas turbine engines exist.

Firstly, large amounts of liquid nitrogen must be provided by mobile tankers. The liquid nitrogen must be converted to gaseous nitrogen and carefully processed to provide the required temperature at different stages of an engine soaking cycle. Within the range of 300 to 350 tons of nitrogen are used for per ten tests, the nitrogen being subsequently discharged into the atmosphere. This is wasteful and costly.

Another drawback of using such large amounts of nitrogen is that it is an asphyxiant. Accordingly, major health and safety precautions need to be taken and expensive monitoring equipment is required to ensure the safety of all of the workers conducting the cold start test. The hazardous nature of nitrogen means access to the engine during the soaking process is not possible.

Another drawback is that the cooling chambers are complex to design and construct. The cost of conventional cold start infrastructure and equipment ranges from between $12M to $15M. Cold start test programs require the performance of ten successful engine starts, each requiring only five minutes of running. Typically, 12 to 14 weeks are required to perform the tests, which includes the time consuming installation and commissioning of the infrastructure required. The cost to perform one test program of starts, including the cost of consumable nitrogen, ranges from between $1.5M to $2.0M.

Additionally, major delays and costs are incurred when an engine fails to start during a cold start test. In excess of 20 hours of cooling time as well as additional nitrogen are required to re-attempt a cold start test.

Yet another drawback is that the typical cold start testing method and apparatus are adversely affected by environmental factors. The target temperature of −40° C. can be unattainable during hot and humid weather.

A need exists for a cold start testing apparatus which addresses one or more of these drawbacks.

According to a first aspect of the disclosure there is provided a forced air convection apparatus for cooling a turbomachine, the apparatus comprising:

a duct assembly having one or more outlets which are removably joinable to one or more corresponding air intakes of the turbomachine, and further having one or more inlets which are removably joinable to one or more corresponding exhausts of the turbomachine to enable closed loop recirculatory airflow through the turbomachine and the duct assembly and back to the turbomachine; and an air handling system having a blower arranged to blow air from the one or more inlets of the duct assembly to the one or more outlets of the duct assembly, and further having a heat exchanger configured to cool the air flowing through the duct assembly.

Advantageously, the forced air convection apparatus may use air for cold start testing instead of nitrogen thus avoiding various drawbacks associated with using nitrogen. Firstly, using air instead of nitrogen avoids the cost and energy required to separate nitrogen from air. Additionally, air may be discharged after a cold start test with no environmental impact. Furthermore, air can be breathed by workers performing cold start tests. Accordingly, using air may allow access to the turbomachines during the cool-down period.

Another advantage is that the forced air cooling apparatus may have a simpler construction than the chamber used in conventional cold start testing. Therefore, some of the costs associated with constructing cold start testing infrastructure may be avoided.

Yet, another advantage is that, in use, the closed loop recirculatory airflow means that the amount of air required to perform each cold start test may be much smaller than the corresponding amount of nitrogen required for a conventional cold start test. This may reduce both the energy and time required to cool down a turbomachine using the forced air convection apparatus, allowing more cold start tests to be performed in a given period.

A further advantage is that the apparatus may be less adversely affected by external environmental factors and therefore the turbomachine target temperature of −40° C. may be attainable even during hot and humid weather.

According to a second aspect of the disclosure there is provided a combination of the forced air convection apparatus of the first aspect and a turbomachine connected to the forced air convection apparatus such that the one or more outlets of the forced air convection apparatus are removably joined to one or more corresponding air intakes of the turbomachine, and the one or more inlets of the forced air convection apparatus are removably joined to one or more corresponding exhausts of the turbomachine to enable closed loop recirculatory airflow through the turbomachine and the duct assembly and back to the turbomachine.

According to a third aspect of the disclosure there is provided a use of the forced air convection apparatus of the first aspect for cold start testing a turbomachine.

According to a fourth aspect of the disclosure there is provided a method of cooling a turbomachine comprising the steps of:

providing the combination according to the second aspect of the forced air convection apparatus and the turbomachine connected to the forced air convection apparatus;

operating the blower to circulate an airflow in a closed loop through the turbomachine and the duct assembly and back to the turbomachine; and operating the heat exchanger to cool the recirculatory airflow and hence to cool the turbomachine so that the turbomachine falls below a threshold temperature.

According to a fifth aspect of the disclosure there is provided a procedure for cold start testing a turbomachine comprising:

performing the method of the fourth aspect;

disconnecting the forced air convection apparatus from the turbomachine; and cold start testing the turbomachine.

Optional features will now be set out. These are applicable singly or in any combination with any aspect of the disclosure.

The turbomachine may be a turbofan engine having a first air intake to an engine core and a bypass duct of the engine, a second air intake to a nacelle chamber of the engine, a first exhaust from the engine core and the bypass duct of the engine, and a second exhaust from a nacelle chamber of the engine, and wherein the duct assembly may have corresponding first and second air outlets and corresponding first and second air inlets.

The turbomachine may be an aircraft gas turbine engine or may be an industrial gas turbine engine.

The air handling system may further have one or more air dampers operable to control respective airflows through the duct assembly to the one or more outlets of the duct assembly.

Conveniently, air flowing through the duct assembly may be cooled in the heat exchanger by a liquid refrigerant. This facilitates rapid heat removal from the airflow. In general, liquid refrigerant can be pumped through a heat exchanger at higher mass flow rates than a gaseous refrigerant and accordingly, a higher comparative rate of cooling may be enabled.

The forced air convection apparatus may further have a series cascade of further heat exchangers arranged to cool the liquid refrigerant of the heat exchanger. This may allow the liquid refrigerant to be cooled to a temperature of −65° C., which can facilitate the achievement of −50° C. in the airflow exiting the heat exchanger. Typically the cascade may have three or more of the further heat exchangers connected in series.

More generally, the heat exchanger may be configured to cool the air flowing through the duct assembly such that, in use, the air entering the one or more air intakes of the turbomachine from the one or more corresponding outlets of the forced air convection apparatus is at a temperature of at least −40° C., or preferably at least −45° C. or at least −50° C.

Conveniently, the forced air convection apparatus may further have an airflow control system having one or more sensors for monitoring properties of the air flowing through the duct assembly, wherein data generated by the one or more sensors may be used by the airflow control system to control the air handling system to maintain predetermined operating conditions of the air. The sensors may include one or more temperature sensors, one or more pressure sensors, and/or one or more flowmeters.

Such an airflow control system can modify the flow rate of air flowing out of the air outlet(s) of the duct assembly by operation of the aforementioned air dampers and/or by increase of decrease of the speed of the blower. Additionally or alternatively, the airflow control system can modify the performance of the heat exchanger (e.g. by varying the flow rate of refrigerant) to increase or decrease the rate of heat extraction from the airflow therethrough. Thus in general the data generated by the one or more sensors may be used by the airflow control system to attain and maintain predetermined operating conditions (e.g. flow rate, pressure and/or temperature) of the recirculatory airflow at the outlet(s) of the duct assembly. In this way, the airflow control system can attain and maintain a temperature of between 0° C. and −50° C. within the turbomachine, for example within an engine core, a bypass duct and/or a nacelle chamber.

The forced air convection apparatus may have a sealable connection port to a sump for collecting and removing condensed liquid water from the recirculatory airflow. In this way ice formation in the apparatus can be prevented.

BRIEF DESCRIPTION OF THE DRAWINGS

Embodiments of the disclosure will now be described by way of example with reference to the accompanying drawings in which.

DETAILED DESCRIPTION

Figure 1:
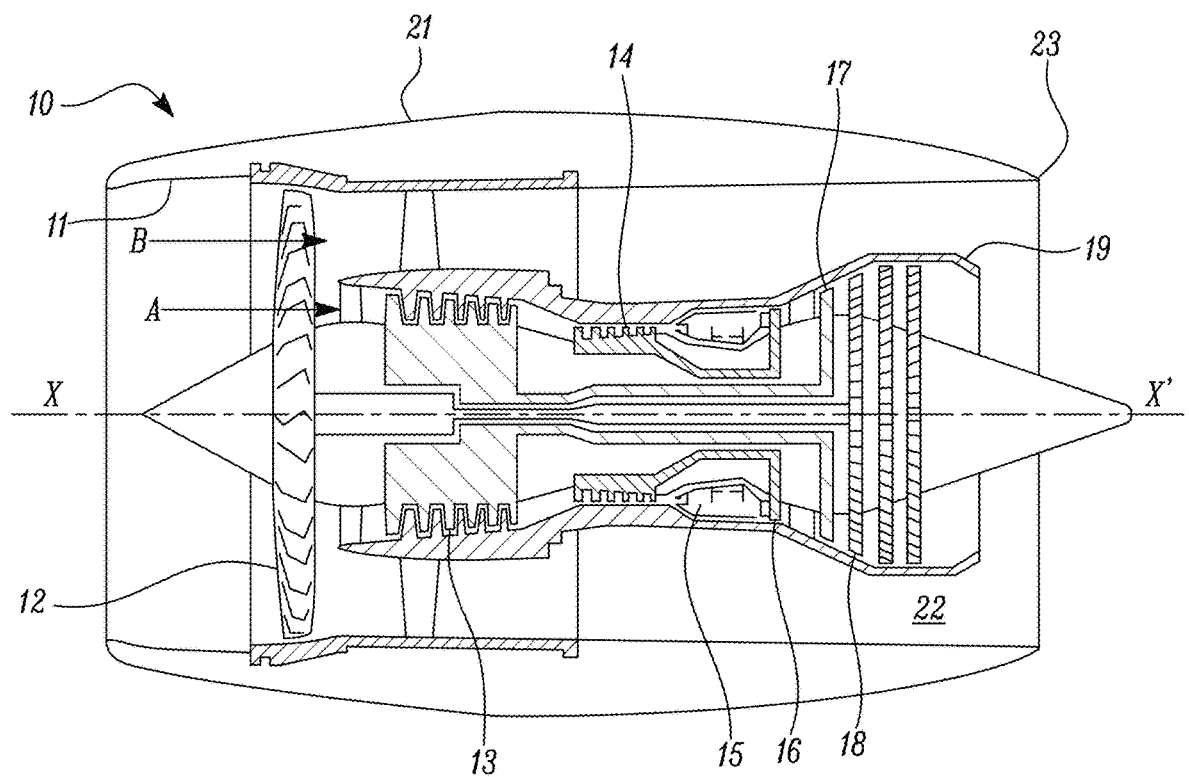
FIG. 1 shows a longitudinal cross-section through a ducted fan gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust 23.

During operation, air entering the intake 11 is accelerated by the fan 12 to produce two air flows: a first airflow A into the intermediate-pressure compressor 13 and a second airflow B which passes through the bypass duct 22 to provide propulsive thrust. The intermediate-pressure compressor 13 compresses the airflow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other gas turbine engines, or indeed turbomachines more generally, to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
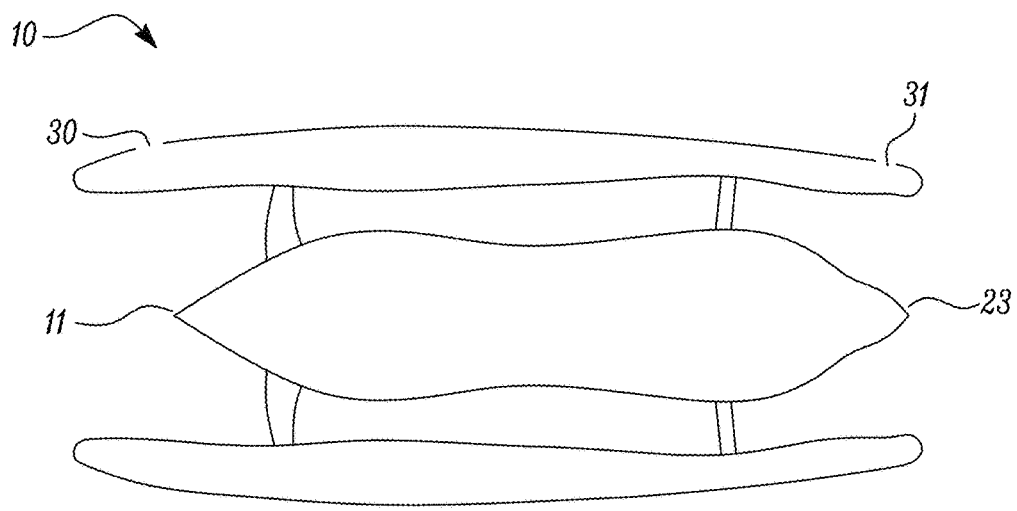
FIG. 2 shows a schematic view of a turbofan engine.

FIG. 2 shows a simplified version of the turbofan engine 10. The turbofan engine has an engine core which receives the first airflow A and which is surrounded by a chamber formed by the bypass duct 22 for airflow B. This chamber is in turn surrounded by the nacelle 21, and within the nacelle is a further nacelle chamber. The intake 11 accepts the airflows A and B to the engine core and the bypass duct chamber and the exhaust 23 removes these airflows from the engine. Additionally, the nacelle chamber has a temporary second air intake 37 and a temporary second exhaust 38 for enabling a separate airflow through this chamber. When installed on an aircraft the second air intake and the second exhaust are closed off.

Figure 3:
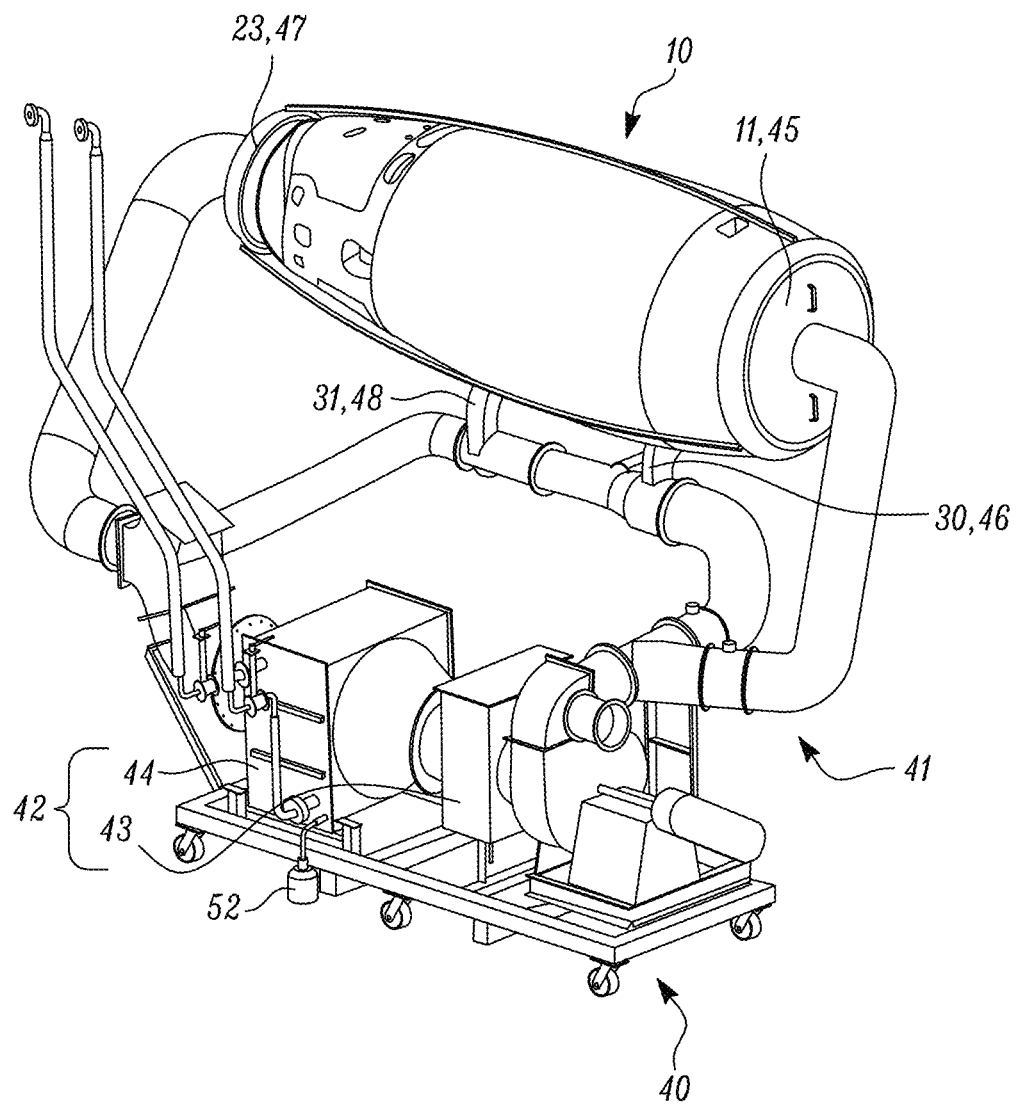
FIG. 3 shows a perspective view of a forced air convection apparatus of the present disclosure joined to a turbofan engine.

FIG. 3 shows a forced air convection apparatus 40 connected to the turbofan engine 10. The forced air convection apparatus has a duct assembly 41, and an air handling system 42 comprising a blower 43 and a primary heat exchanger 44 located on a movable skid. The duct assembly has first 45 and second 46 air outlets which, in order to cool the engine prior to performance of a cold start test, are removably joined respectively to the first 11 and second 30 intakes and first 47 and second 48 air inlets removably joined respectively to the first 23 and second 31 exhausts. The removable joints can be formed by quick disconnect type fittings.

The joined combination of the duct assembly 41 and the engine 10 forms a closed loop for recirculatory airflow driven by the blower 43. In particular, the blower drives air through a first half of the duct assembly 41 to the first 45 and second 46 air outlets, through the engine core, bypass chamber and nacelle chamber of the turbofan engine to the first 47 and second 48 air inlets, and then through a second half of the duct assembly back to the blower. The primary heat exchanger 44 is on the closed loop and cools the airflow on each pass through the air handling system 42. The primary heat exchanger can be configured to enable efficient cooling of the airflow from a temperature of 40° C. to a temperature in the range from −40° C. to −50° C. Water may be removed from the airflow before the air is cooled below 0° C. to prevent ice formation which can cause the apparatus 40 to malfunction. By dropping the ambient temperature to approximately 5° C., most of the condensed water content within the volume of recirculated airflow can be drained into a sump 52, e.g. in the form of a container having a connection port to the rest of the duct assembly that can be sealed. This allows the water-filled container to be removed and the water disposed of without external humid air ingressing into the airflow, thereby avoiding further potential ice formation. Optionally the, or another, empty container can be refitted to the port, to capture any remaining water in the recirculatory airflow as the apparatus continues to reduce the temperature further, and ultimately to below 0° C.

Figure 4:
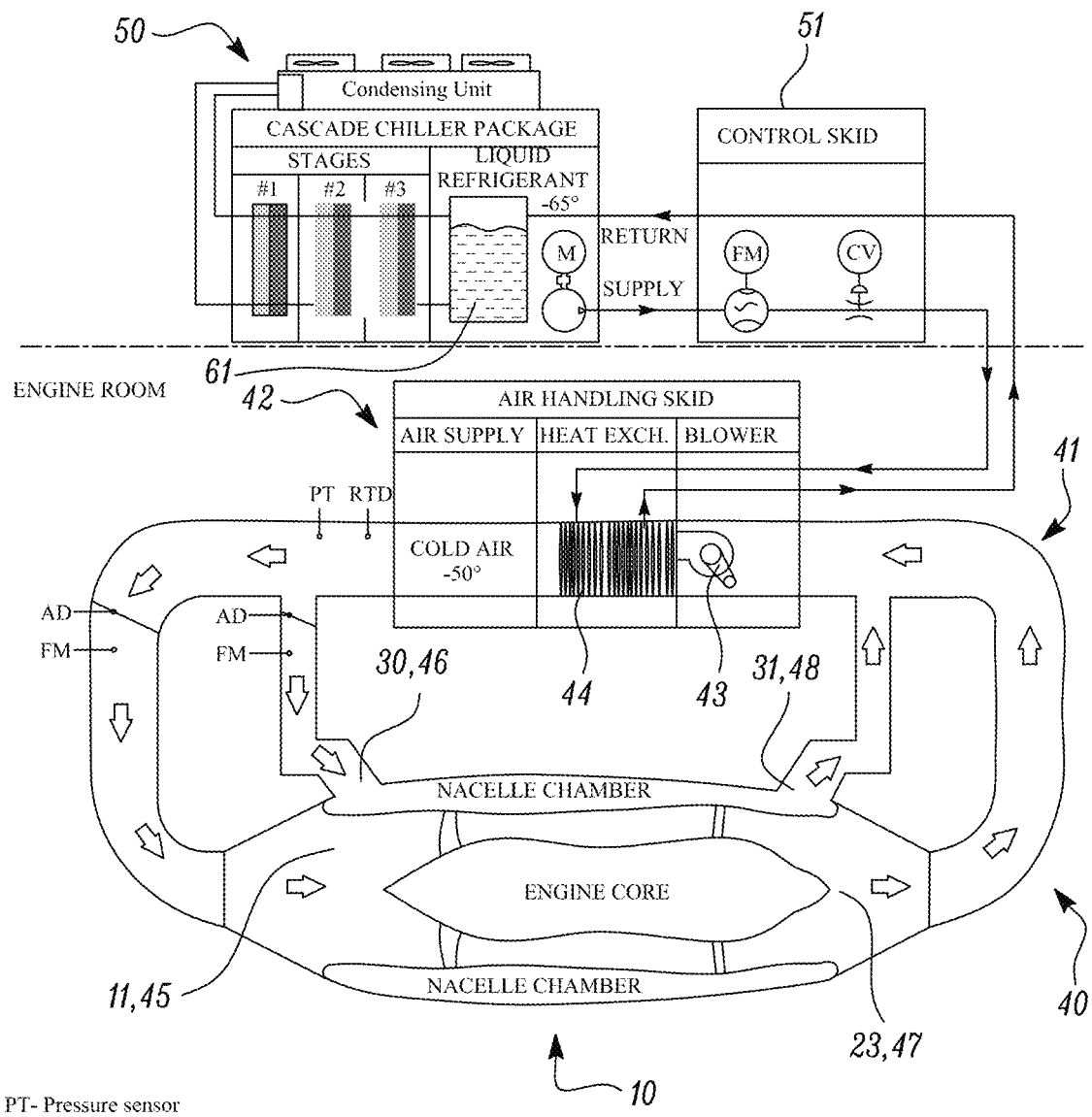
FIG. 4 shows a schematic view of a forced air convection apparatus of the present disclosure joined to a turbofan engine.

FIG. 4 shows a schematic view of the forced air convection apparatus 40 and the turbofan engine 10 located in an engine test room. Outside the room, further elements of the apparatus include a high performance chiller unit 50 and an airflow control system 51. The chiller unit comprises cryogenic based equipment including a cascade of further heat exchangers #1, #2, #3. The air handling system, in addition to the features discussed with respect to FIG. 3, further comprises air dampers AD to control the airflow to the first 45 and second 46 air outlets. A pressure sensor PT, temperature sensor RTD, and flow meters FM allow airflow conditions within the duct assembly 41 to be monitored, as discussed below.

The heat exchangers #1, #2, #3 in the chiller unit 50 operate in series to provide progressive stages of refrigeration, wherein heat exchanger #1 cools heat exchanger #2, which in turn cools heat exchanger #3. Heat exchanger #3 cools a liquid refrigerant 61 to a temperature of −65° C. The cooled liquid refrigerant is then pumped from the chiller unit 50 to the cold side of the primary heat exchanger 44 to cool the airflow within the closed loop formed by the duct assembly 41 and the turbofan engine 10. Thereafter liquid refrigerant is pumped back to the chiller unit to be cooled back to −65° C. An advantage of using liquid refrigerant to cool the primary heat exchanger is it can be pumped to and from the primary heat exchanger at a higher flow rate than typical gaseous refrigerants.

The overall development of the forced air convection apparatus 40 was assisted by a Computational Fluid Dynamic (CFD) analysis of the recirculatory airflow and its ability to cool the engine 10. The CFD analysis established the capability of the apparatus to expeditiously remove heat from compartments of the engine. The CFD analysis also helped determine the overall capacity and size of the chiller unit 50 needed to provide a suitable mass flow, temperature and pressure of liquid refrigerant 61 used to cool the forced airflow. In addition, the CFD analysis provided confidence that uniform cooling of engine compartments and components could be achieved.

The air handling system 42 has a first air damper AD on a first branch of the duct assembly 41 to control airflow from the first air outlet 45 of the duct assembly and a second air damper AD on a second branch of the duct assembly to control airflow from the second air outlet 46. Additionally, first and second flowmeters FM measure the flowrate of the air flowing to the first and second air outlets on the respective branches of the duct assembly. The pressure sensor PT and the temperature sensor RTD are disposed in the duct assembly after the blower 43 and the primary heat exchanger 44 but before the duct assembly splits into the first and second branches.

The data provided by the flowmeters FM, pressure sensor PT and temperature sensor RTD are used by the airflow control system 51 to achieve predetermined operating conditions of the air. In particular, the airflow control system may attain or maintain predetermined operating conditions of flowrate, pressure and/or temperature by opening or closing the air dampers AD; increasing or decreasing the speed of the blower 43; and/or increasing or decreasing the flowrate of the liquid refrigerant 61 passing through the primary heat exchanger 44. In this way, the airflow control system can maintain any temperature between 0° C. and −45° C. to an accuracy of ±0.5° C. within the engine core and bypass duct chamber, and the nacelle chamber. Additionally, the airflow control system can maintain a temperature difference between the engine core and bypass duct chamber, and the nacelle chamber of no more than ±1.0° C. Predetermined operating conditions may include an air temperature of at least −40° C., or preferably at least −45° C. or at least −50° C., at the outlets 45, 46 of the duct assembly 41.

To perform a cold start test, the duct assembly 41 is joined up to the turbofan engine 10 as described above to form the closed loop for recirculatory airflow driven by the blower 43. Liquid refrigerant 61 from the chiller unit 50 is pumped through the primary heat exchanger 44 and cools the airflow. The sensors PT, RTD, FM provide data for the airflow control system 51 to attain and maintain predetermined operating conditions of the air. Once the turbofan engine is cooled to a suitable temperature, the first 45 and second 46 air outlets are disconnected from the first 11 and second 30 intakes and the first 47 and second 48 air inlets are disconnected from the first 23 and second 31 exhausts, and the duct assembly 41 is then removed from the engine test room. This typically takes about 15 minutes to perform. The cold start test can then be initiated, with the air handling system 42 staying in the test room.

The force air convection apparatus allows the cooling of various additional engine chambers, and individual engine components for cold temperature testing and certification. These may be installed on the engine 10, and include accessories such as gearboxes, electric generators, hydraulic pumps, fuel control valves and oil system components.

A primary difference between the forced air convection apparatus and a conventional soaking apparatus for cooling turbomachines is that the forced air convection apparatus directs cold air within a turbomachine's integral enclosures whereas the conventional soaking apparatus requires a turbomachine to be placed in a large cooling chamber and to be cooled by cold nitrogen gas. The forced air convection apparatus has numerous advantages over conventional soaking cooling approaches.

For example, the forced air convection apparatus uses a closed loop recirculatory airflow instead of large quantities of nitrogen. The closed loop recirculatory airflow also provides a dramatic reduction in the energy required to cool a turbomachine in comparison to conventional methods. Another advantage of the closed loop convection apparatus is that precise temperature control, of an accuracy of ±0.5° C. can be attained.

Additionally, the forced air convection apparatus can reduce the cost of the infrastructure required, and the cost to perform cold start tests by approximately 85% and 50% respectively.

Furthermore, the forced air convection apparatus can greatly reduce the total time required to prepare the apparatus and to perform cold start tests, e.g. by approximately 85%. Accordingly, three cold start tests can be conducted in one day using the forced air convection approach where before conventionally only one test could be conducted.

Another such example is that the forced air convection apparatus allows turbomachines to be cooled down during very hot and humid ambient conditions, thus allowing cold start tests to be conducted at any location.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A forced air convection apparatus (40) for cooling a turbomachine (10), the apparatus comprising:
    a duct assembly (41) having one or more outlets (45, 46) which are removably joinable to one or more corresponding air intakes (11, 30) of the turbomachine, and further having one or more inlets (47, 48) which are removably joinable to one or more corresponding exhausts (23, 31) of the turbomachine to enable closed loop recirculatory airflow through the turbomachine and the duct assembly and back to the turbomachine; and
    an air handling system (42) having a blower (43) arranged to blow air from the one or more inlets of the duct assembly to the one or more outlets of the duct assembly, and further having a heat exchanger (44) configured to cool the air flowing through the duct assembly.

2. The forced air convection apparatus according to claim 1, wherein the turbomachine is a turbofan engine having a first air intake (11) to an engine core and a bypass duct of the engine, a second air intake (30) to a nacelle chamber of the engine, a first exhaust (23) from the engine core and the bypass duct of the engine, and a second exhaust (31) from a nacelle chamber of the engine, and wherein the duct assembly has corresponding first and second air outlets and corresponding first and second air inlets.

3. The forced air convection apparatus according to claim 1, wherein the air handling system further has one or more air dampers (AD) operable to control respective airflows through the duct assembly to the one or more outlets of the duct assembly.

4. The forced air convection apparatus according to claim 1, wherein the air flowing through the duct assembly is cooled in the heat exchanger (44) by a liquid refrigerant (61).

5. The forced air convection apparatus according to claim 4 which further has a series cascade of further heat exchangers (#1, #2, #3) arranged to cool the liquid refrigerant of the heat exchanger.

6. The forced air convection apparatus according to claim 1, wherein the heat exchanger is configured to cool the air flowing through the duct assembly such that, in use, the air entering the one or more air intakes of the turbomachine from the one or more corresponding outlets of the forced air convection apparatus is at a temperature of −40° C. or below.

7. The forced air convection apparatus according to claim 1 which further has an airflow control system (51) having one or more sensors (PT, RTD, FM) for monitoring properties of the air flowing through the duct assembly, wherein data generated by the one or more sensors is used by the airflow control system to control the air handling system to maintain predetermined operating conditions of the air.

8. The forced air convection apparatus according to claim 1 which further has a sealable connection port to a sump (52) for collecting and removing condensed liquid water from the recirculatory airflow.

9. A combination of the forced air convection apparatus according to claim 1 and a turbomachine connected to the forced air convection apparatus such that the one or more outlets of the forced air convection apparatus are removably joined to one or more corresponding air intakes of the turbomachine, and the one or more inlets of the forced air convection apparatus are removably joined to one or more corresponding exhausts of the turbomachine to enable closed loop recirculatory airflow through the turbomachine and the duct assembly and back to the turbomachine.

10. Use of the forced air convection apparatus according to claim 1 for cold start testing a turbomachine.

11. A method of cooling a turbomachine comprising the steps of:
    providing the combination according to claim 9 of the forced air convection apparatus and the turbomachine connected to the forced air convection apparatus;
    operating the blower to circulate an airflow in a closed loop through the turbomachine and the duct assembly and back to the turbomachine; and operating the heat exchanger to cool the recirculatory airflow and hence to cool the turbomachine so that the temperature of the turbomachine falls below a threshold temperature.

12. The method of claim 11, further comprising the step of removing condensed liquid water from the recirculatory airflow.

13. A procedure for cold start testing a turbomachine comprising:
performing the method of claim 11;
disconnecting the forced air convection apparatus from the turbomachine; and
cold start testing the turbomachine.

* * * * *